(12) United States Patent
Hordis

(10) Patent No.: US 7,661,201 B1
(45) Date of Patent: Feb. 16, 2010

(54) MAGNETIC LOCATOR SYSTEM

(76) Inventor: Robert Hordis, 154 Country Club Dr., Lumberton, NJ (US) 08048

( * ) Notice: Subject to any disclaimer, the term of this patent is extended or adjusted under 35 U.S.C. 154(b) by 54 days.

(21) Appl. No.: 12/197,114

(22) Filed: Aug. 22, 2008

Related U.S. Application Data

(60) Provisional application No. 60/965,889, filed on Aug. 24, 2007.

(51) Int. Cl.
*G01B 3/14* (2006.01)
(52) U.S. Cl. .................. 33/528; 33/DIG. 10; 33/DIG. 1
(58) Field of Classification Search .................. 33/526, 33/528, 562, 563, DIG. 1, DIG. 100
See application file for complete search history.

(56) References Cited

U.S. PATENT DOCUMENTS

| | | | |
|---|---|---|---|
| 1,971,189 A | 8/1934 | Liebing | |
| 3,722,360 A | 3/1973 | Blakey et al. | |
| 3,723,928 A | 3/1973 | Blakey et al. | |
| 3,745,664 A * | 7/1973 | Altseimer | 33/528 |
| 4,342,145 A | 8/1982 | Kotchy | |
| 4,372,050 A * | 2/1983 | Eisenhauer | 33/528 |
| 4,384,396 A | 5/1983 | Smolik | |
| 4,388,890 A | 6/1983 | Wester et al. | |
| 4,930,382 A * | 6/1990 | Collins | 33/562 |
| 5,434,500 A | 7/1995 | Hauck et al. | |
| 6,452,097 B1 | 9/2002 | DeWall | |
| 6,708,421 B1 | 3/2004 | Crorey | |
| 7,134,217 B2 | 11/2006 | Melittas | |
| 7,367,131 B1 | 5/2008 | Hordis | |
| 2008/0092401 A1 * | 4/2008 | Holcombe | 33/528 |

* cited by examiner

Primary Examiner—G. Bradley Bennett

(57) ABSTRACT

A system for locating a junction box installed within the framework of a structure and behind a wall includes a hidden magnetic assembly removably mounted on a junction box, and a second magnetic assembly located outside of the wall used to identify the location of the first magnetic assembly and thereby the junction box behind the wall.

11 Claims, 2 Drawing Sheets

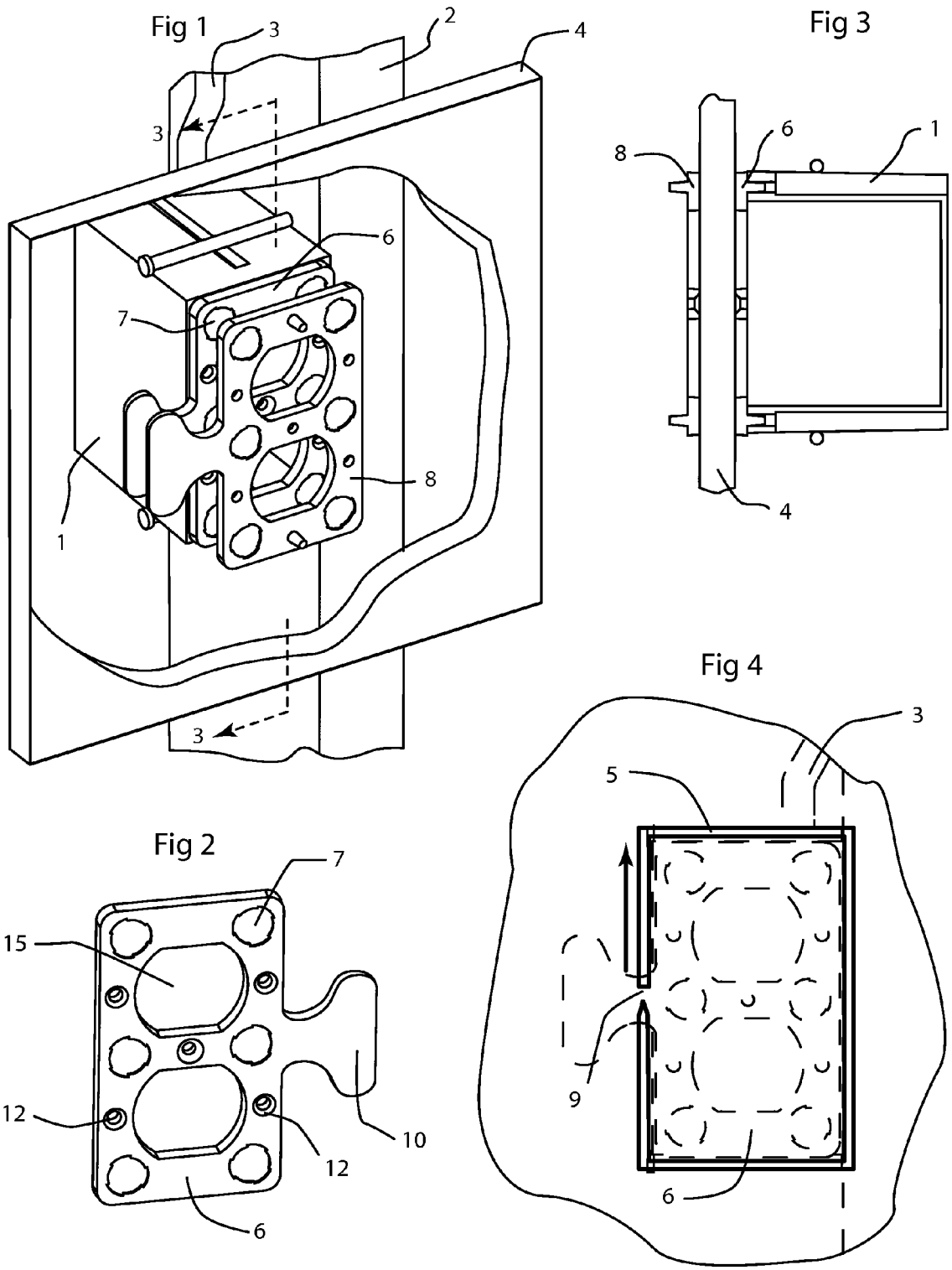

MAGNETIC LOCATOR SYSTEM

This application claims benefit of Provisional Patent No. 60/965,889 filed Aug. 24, 2007 by Robert Victor Hordis applicant.

BACKGROUND OF THE INVENTION

This invention relates to the locating and subsequent cutting of openings for hidden objects, especially junction boxes in building construction and remodeling wherein the junction box is covered by a decorative sheet material after installation. The invention provides for locating openings without the use of measuring tools or piercing means.

Junction box locating means have been proposed wherein magnets are used to locate the box to be cut around with relatively large magnets placed internally to the box as illustrated in U.S. Pat. Nos. 4,384,396; 4,388,890 and 6,708,421. Each of these systems has serious drawbacks when used in practice, especially in terms of versatility. These systems are designed to be used on limited box configurations and can interfere with internal box components including wiring or receptacles. The use of a locating assembly which can be mounted on the surface of the junction box, without penetration into the wire or component containing portion is highly beneficial as it allows the device to be used on a multitude of junction box configurations regardless of box shape, size, or internal fills and components. Two common aspects of nearly all single and multigang junction boxes are component mounting hole configuration and standard cover-plate size. By providing a cutout pattern which is smaller than the standard cover-plate and provides for attachment on the two mounting holes while remaining external to the box, the device works with most single and multigang boxes.

Another object of the invention is to provide openings for alignment on, and accommodation of, installed receptacles.

Another object of the invention is to provide a support tab to reduce the occurrence of pressure breaks in the decorative sheet covering while making cutouts.

Another object of the invention is to provide alignment holes to allow the device to be used with multigang boxes.

SUMMARY OF THE INVENTION

The present invention is designed to overcome the deficiencies of the prior art, particularly as discussed above. It is an object of the present invention to provide an efficient and accurate system for locating a junction box.

It is another object of the present invention to provide a system for locating a junction box easily and inexpensively.

It is another object of the present invention to provide a system for locating a junction box or hidden object which is versatile and which can be used for many different boxes and other hidden objects.

In accordance with the illustrative embodiments demonstrating features and advantages of the present invention, there is provided a system for locating a junction box installed on the framework of a structure and behind a wall or similar surface such as a drywall sheet including a magnetic assembly removably mounted upon the face of a junction box or other hidden structure for which an access opening is to be made, and another magnetic assembly on the outside surface of the wall covering which visibly defines the shape of the access opening prior to piercing of the wall covering.

Other objects, features and advantages of the invention will be readily apparent from the following detailed description of a preferred embodiment thereof taken in conjunction with the drawings.

BRIEF DESCRIPTION OF THE DRAWINGS

The construction of the invention in context of its use will be described hereinafter. An improved understanding of the invention may be gained from the following specification and the associated drawings, in which:

FIG. 1. is a perspective view of a pair of magnetic bodies affixed to a junction box, with a sheet of surfacing material between the two magnetic bodies;

FIG. 2. is a perspective view of a single magnetic body;

FIG. 3. is a cross sectional view of a pair of magnetic bodies separated by a sheet of surfacing material, affixed to a junction box;

FIG. 4. is a front view of an access hole cutout pattern in a sheet of surfacing material over a hidden magnetic body;

DESCRIPTION OF A PREFERRED EMBODIMENT

Figure 5:
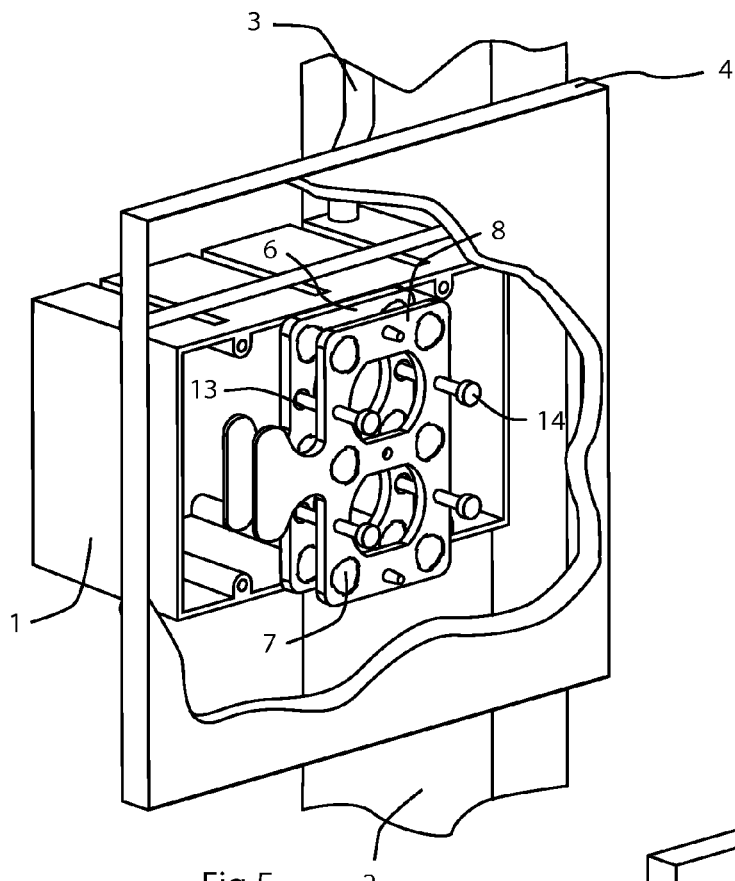
FIG. 5. is a perspective view of a pair of magnetic bodies affixed to a multigang junction box, with a sheet of surfacing material between the magnetic bodies.
Figure 6:
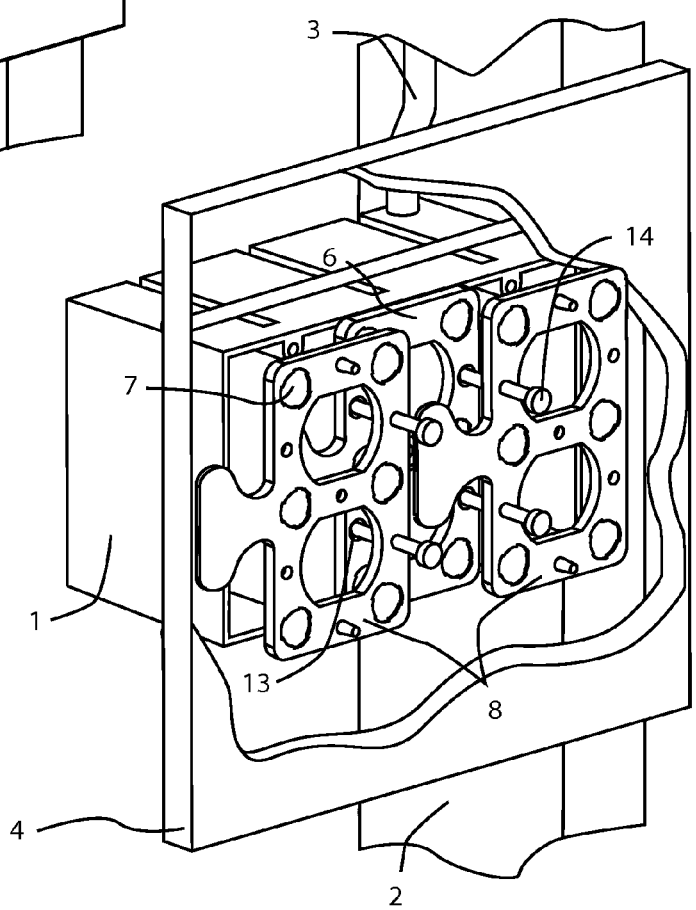
FIG. 6. is a perspective view of multiple magnetic bodies affixed to a multigang junction box, with a sheet of surfacing material between the magnetic bodies.

The figures depict a typical junction box 1 installation consisting of a frame 2 or other building structure and a junction box 1 assembly composed of a protective box, wires or inputs such as fiber optics and or lighting apparatus. The box 1 could house fluid transfer means as well. The junction box 1 is firmly attached to the frame 2 structure with an access opening which faces the desired service and installation location a workman would use to install the wiring and maintain the box. The frame 2 structure is typically covered with some type of sheet material 4 such as drywall or paneling and an opening 5 is formed in the sheet material 4 to allow access to the junction box 1.

To facilitate locating and forming the opening 5 in the sheet material, a device constructed of a first body 6 consisting of or containing magnetic or magnetically attractable materials 7 is affixed to the outward facing surface of the junction box 1 prior to the installation of the sheet material 4. The sheet material 4 is then attached to the frame 2 structure so as to cover the junction box 1. Substantial location of the junction box 1 is attained by use of a second body 8 consisting of or containing magnetic or magnetically attractable materials 7 which interacts with the first body 6 behind the sheet material covering 4. The interaction of the magnetic bodies 6,8 substantially provides the user with the location of the junction box 1 without piercing or physically altering the sheet material 4 covering. The design of the magnetic bodies 6,8 may consist of bodies which are identical or nearly identical to allow them to be made by simplified manufacturing processes. The bodies 6,8 would preferably contain one or more magnets 7 which would be arranged or formed in such a way as to allow both substantial attraction between the bodies 6,8 and substantial axial alignment for improved use with non-annular junction boxes. The first magnetic body 6 should be formed to so as to allow it to be mounted on top of the access surface of the junction box 1 to permit the use of junction boxes of varying internal and external configurations. Surface mounting of the first magnetic body 6 is desirable to prevent physical interference with any components of the junction box including wires, timers, electronics or installed outlets.

A preinstalled junction box 1 generally protrudes beyond the plane of the frame 2 structure an amount equal to the thickness of the sheet material 4 covering to enable the outward facing surface of the junction box 1 to lie flush with the outward facing surface of the sheet material 4 after the access hole cutout 5 is made. This junction box protrusion causes localized pressure on the sheet material 4 as it is fastened to the frame 2 structure prior to cutting the access hole 5 opening due to fastener pressure on the sheet material 4 forcing it to become flush with the frame 2 structure. As the access hole 5 is cut the pressure becomes increasingly localized and can cause cosmetic failure of the sheet material at the completion location 9 of the access hole 5 cutout. The first magnetic body 6 may therefore be provided with one or more extensions 10 which protrude laterally beyond the normal envelope of the junction box 1 to provide a roughly planar surface for contact with the sheet material 4 covering. Said extension 10 may be removable for different material requirements. The extension 10 functions as a load spreader to prevent undesirable breakage of the sheet material 4 covering, particularly drywall, at the completion location 9 of the access hole 5 cutout. Upon completion of the access hole 5 cutout, the first magnetic body 6 is removed by sliding or pivoting through the access hole 5 cutout, with the extension 10 exiting last.

To facilitate the use of the magnetic bodies 6,8 on multi-gang or multi-compartment junction boxes 11, alignment holes 12 which correspond with pre-calculated sheet material cutout dimensions may be formed in the magnetic bodies 6,8. During use these alignment holes 12 may be used as a guide to mark with a writing or scribing instrument, but are preferably beveled 13 to facilitate alignment with a drill bit, screw or other pin-like device 14. The preferred configuration of the alignment holes 12 being two holes on either side of the magnetic body 6 with both the first body 6 and second body 8 being likewise. The number of alignment holes 12 on the magnetic bodies 6,8 could conceivably vary and may be different on the first body 6 and second body 8. The function of the alignment holes 12 is to provide a guide for piercing the sheet material 4 covering to prove an exact alignment location between the first magnetic body 6 and second magnetic body 8 useful for demonstrating the desired location of the access hole cutout for the multigang junction box 11.

An especially desirable improvement to the first magnetic body 6 may be the addition of recess holes 15 to align on and accommodate installed electrical outlets. The recess holes 15 may be annular with two flats or a single large hole could be formed to function with ground fault or similar outlets. Other recess shapes, depressions and configurations are possible to accommodate different outlets or fixturing external to the junction box 1. The magnetic bodies 6,8 may also be designed to reside on the surface of said fixturing without the use of any holes or depressions. The magnetic bodies 6,8 may also be designed to be interchangeable with each other or have slight modifications such as special holes or pins to allow the first body 6 and second body 8 to be interchanged for different junction box 1 fixturing means.

The most advantageous method of manufacture of the magnetic bodies 6,8 is a molded plastic or metal body with multiple integral molded magnet cavities; the magnets 7 being molded, pressed or snap-fit into the body 6. Small rare earth magnets 7 are the most desirable alignment means due to the need for the body 6 to be as thin as possible for successful surface mounting.

The term junction box should be understood to mean any sort of fixed or temporarily fixed hidden object behind a wall surface in which a hole or opening is intended to be made to expose the box or a portion thereof.

The present invention may be embodied in other specific forms without departing from the spirit or essential attributes thereof and accordingly, reference should be made to the appended claims in superiority to the foregoing specification as indicating the scope of the invention.

I claim:

1. A system for locating a junction box which has a front forwardmost edge and installed upon the framework of a structure and substantially behind a wall, floor, ceiling or other finish surface covering comprising:
   a magnetic device removably mounted on said junction box wherein the device is not in or within the junction box, but upon the surface of the junction box;
   a surface device for locating said magnetic device through the surface covering and visually defining the shape or portion of the shape of the desired access opening for the junction box prior to cutting of the access opening.

2. The system for locating a junction box of claim 1 in which said surface device is a magnetic device.

3. The system for locating a junction box of claim 1 in which said magnetic device is composed partially or completely of a magnetically attractable material and wherein the magnetic device does not physically penetrate through the surface covering.

4. The system for locating a junction box of claim 1 in which said surface device is capable of visually defining the shape or portion of the shape of the desired access opening for the junction box prior to penetrating through the surface covering, wherein the surface device is composed of two or more co-operating bodies.

5. The system for locating a junction box of claim 1 in which said surface device contains one or more magnets.

6. The system for locating a junction box of claim 1 in which said magnetic device contains one or more magnets.

7. The system for locating a junction box of claim 1 in which said magnetic device contains a protrusion which prevents premature tearing of the cosmetic surface of the sheet covering.

8. The system for locating a junction box of claim 1 in which said magnetic device is specially shaped to accommodate installed components of the junction box including electrical outlets.

9. The system for locating a junction box of claim 1 in which said magnetic device and said surface device cooperate in such as away as to be interchanged to accommodate different box styles or components.

10. The system for locating a junction box of claim 1 in which said surface device contains alignment holes or other features which visually define the shape or portion of the shape of the desired access opening for junction boxes of various shapes and sizes prior to cutting of the access opening, said surface device being traced or otherwise marked and subsequently realigned to visually define the overall desired shape.

11. A system for locating a junction box which has a front forwardmost edge and installed upon the framework of a structure and substantially behind a wall, floor, ceiling or other finish surface covering comprising:
   a magnetic device removably mounted within said junction box wherein the device is formed to fit around electrical outlets, switches, timers, dimmers, receivers, transmitters, photosensors, telephone jacks, cable jacks or network jacks;
   a surface device for locating said magnetic device through the surface covering and visually defining the shape or portion of the shape of the desired access opening for the junction box prior to cutting of the access opening.

* * * * *